(12) United States Patent
Clark et al.

(10) Patent No.: US 7,698,424 B1
(45) Date of Patent: Apr. 13, 2010

(54) TECHNIQUES FOR PRESENTING MULTIPLE DATA STORAGE ARRAYS TO ISCSI CLIENTS AS A SINGLE AGGREGATED NETWORK ARRAY

(75) Inventors: Roy Clark, Hopkinton, MA (US); Kiran Madnani, Framingham, MA (US); Stephen M. Lathrop, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 1597 days.

(21) Appl. No.: 10/952,320

(22) Filed: Sep. 28, 2004

(51) Int. Cl.
*G06F 15/173* (2006.01)
*G06F 15/167* (2006.01)

(52) U.S. Cl. ...................... 709/225; 709/213
(58) Field of Classification Search .......... 709/212–216
See application file for complete search history.

(56) References Cited

U.S. PATENT DOCUMENTS

| | | | |
|---|---|---|---|
| 6,839,740 B1 | 1/2005 | Kiselev | 709/214 |
| 6,839,746 B1 | 1/2005 | Muthiyan et al. | 709/220 |
| 6,845,403 B2* | 1/2005 | Chadalapaka | 710/5 |
| 6,889,249 B2* | 5/2005 | Miloushev et al. | 709/213 |
| 6,952,743 B2 | 10/2005 | Ortega, III et al. | 710/5 |
| 7,403,987 B1* | 7/2008 | Marinelli et al. | 709/223 |
| 7,440,949 B1* | 10/2008 | Barker | 707/10 |
| 2003/0115447 A1* | 6/2003 | Pham et al. | 713/153 |
| 2004/0054866 A1* | 3/2004 | Blumenau et al. | 711/202 |
| 2004/0250026 A1* | 12/2004 | Tanoue | 711/151 |
| 2005/0097271 A1* | 5/2005 | Davies et al. | 711/114 |
| 2005/0114624 A1* | 5/2005 | Cervantes et al. | 711/206 |
| 2005/0204049 A1* | 9/2005 | Ueoka et al. | 709/229 |

* cited by examiner

*Primary Examiner*—Patrice Winder
*Assistant Examiner*—Minh-Chau Nguyen
(74) *Attorney, Agent, or Firm*—BainwoodHuang (57) ABSTRACT

An aggregator device provides an iSCSI client with a list of storage areas which are offered by a single aggregated network array. The storage areas on the list are provided by multiple data storage systems and are accessible by the client using data paths which are out-of-band with the aggregator device. The aggregator device further receives an iSCSI login request from the client. The iSCSI login request identifies a particular storage area on the list of storage areas. The aggregator device further generates and sends an iSCSI login response to the client in response to the iSCSI login request. The iSCSI login response includes a network address of a particular data storage system of the multiple data storage systems which provides the particular storage area to enable the client to directly access the particular storage area using a data path which is out-of-band with the aggregator device.

20 Claims, 5 Drawing Sheets

| | | |
|---|---|---|
| 80(a) | VOL0 | 10.15.20.1 (E.G., IP ADDRESS OF ARRAY 44(1)) |
| 80(b) | VOL1 | 10.15.20.1 (E.G., IP ADDRESS OF ARRAY 44(1)) |
| 80(c) | VOL2 | 10.15.20.1 (E.G., IP ADDRESS OF ARRAY 44(1)) |
| 80(d) | VOL3 | 10.15.20.2 (E.G., IP ADDRESS OF ARRAY 44(2)) |
| 80(e) | VOL9 | 10.15.20.2 (E.G., IP ADDRESS OF ARRAY 44(2)) |
| 80(f) | VOL8 | 10.15.20.2 (E.G., IP ADDRESS OF ARRAY 44(2)) |
| 80(g) | VOL7 | 10.15.20.3 (E.G., IP ADDRESS OF ARRAY 44(3)) |
| 80(h) | VOL6 | 10.15.20.3 (E.G., IP ADDRESS OF ARRAY 44(3)) |
| 80(i) | VOL4 | 10.15.20.3 (E.G., IP ADDRESS OF ARRAY 44(3)) |
| 80(j) | VOL5 | 10.15.20.1 (E.G., IP ADDRESS OF ARRAY 44(1)) |

TECHNIQUES FOR PRESENTING MULTIPLE DATA STORAGE ARRAYS TO ISCSI CLIENTS AS A SINGLE AGGREGATED NETWORK ARRAY

BACKGROUND

The iSCSI protocol is a standard developed by the Internet Engineering Task Force (IETF) for communicating SCSI commands and data over TCP/IP networks. In this context, iSCSI client computers called "initiators" operate to store data into and retrieve data from data storage arrays called "targets" using packets transmitted over Ethernet connections (the Internet, LANs, WANs, etc.). Each data storage array is a specialized computer system configured to store data within portions of computerized memory (e.g., volumes, LUNs, etc.) with a high level of fault tolerance (e.g. RAID) and low latency (e.g., caching optimizations).

One conventional approach to operating multiple data storage arrays is for a system administrator to manage the arrays as separate array elements. Under this approach, each iSCSI client (or initiator) views the multiple data storage arrays as individual, independent arrays. For example, the clients can view a first array, ARRAY1, which provides access to multiple volumes VOL0, VOL1, VOL2, etc. Similarly, the clients can separately view a second array, ARRAY2, which provides access to multiple other volumes VOL0, VOL1, VOL2, etc., and so on.

Figure 1:
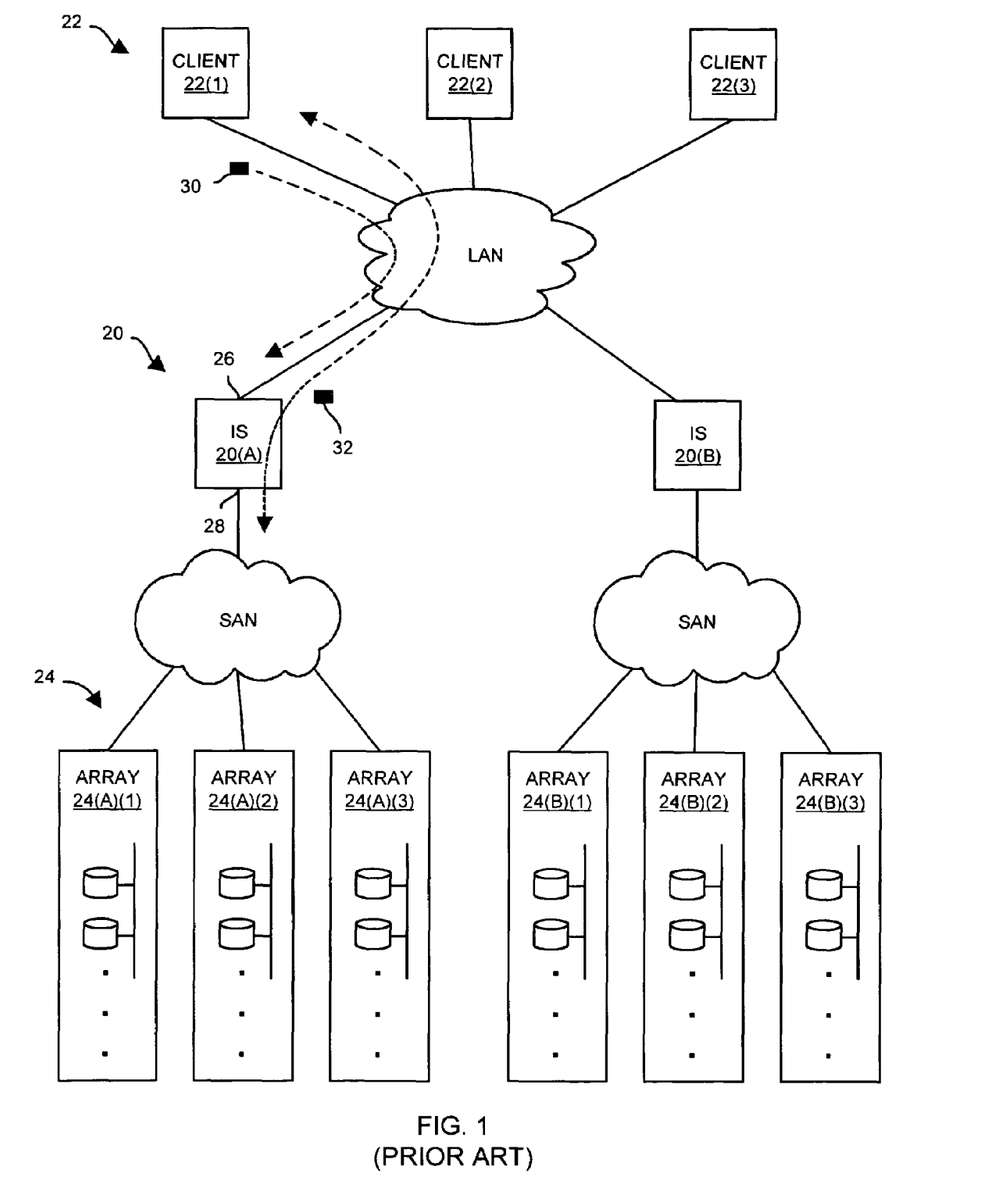
FIG. 1 is a block diagram of a conventional situation which utilizes an Intelligent Switch to present multiple data storage arrays to iSCSI clients as a single array.

Another conventional approach, which is illustrated in FIG. 1, involves the use of an Intelligent Switch (IS) 20 which (i) interconnects between iSCSI clients 22 and multiple data storage arrays 24, and (ii) enables the iSCSI clients 22 to view the data storage arrays 24 as a single array. FIG. 1 shows an IS 20(A) having a client-side interface 26 for connecting to multiple iSCSI clients 22(1), 22(2), 22(3), and an array-side interface 28 for connecting to multiple data storage arrays 24(A)(1), 24(A)(2), 24(A)(3). During operation, the IS 20(A) essentially acts as a front-end to the data storage arrays 24(A)(1), 24(A)(2), 24(A)(3) by receiving iSCSI commands 30 from the clients 22 and processing these iSCSI commands 30 on behalf of the clients 22. Furthermore, data 32 which is exchanged between the clients 22 and the data storage arrays 28(A)(1), 28(A)(2), 28(A)(3) passes through the IS 20(A) in an "in-band" manner. To increase throughput beyond that which is provided by the IS 20(A), other ISs 20 can be added. For example, as further shown in FIG. 1, another IS 20(B) operates as a front-end to additional data storage arrays 28(B)(1), 28(B)(2), 28(B)(3). In this situation, each client 22 must be configured to communicate with two arrays, i.e., a first array presented by the IS 20(A) and a second array presented by the IS 20(B).

SUMMARY

Unfortunately, there are deficiencies to the above-described approaches to operating data storage arrays. For example, in connection with the above-described conventional approach of presenting multiple data storage arrays as individual arrays, the iSCSI clients must keep track of each data storage array individually which can be burdensome. Along these lines, suppose that a new data storage array is added to increase storage capacity. Here, each client must now be manually reconfigured (e.g., by a system administrator) to access the new data storage array as a newly-added, separate array element. This burden increases with the addition of each new data storage array.

Furthermore, in connection with the above-described conventional approach of presenting multiple data storage arrays 24(A)(1), 24(A)(2), 24(A)(3) as a single array through an IS 20(A) (see FIG. 1), the IS 20(A) resides at an inline location between the clients 22 and the data storage array 24(A)(1), 24(A)(2), 24(A)(3), and the data 32 passes through the IS 20(A) in an "in-band" manner. Accordingly, the IS 20(A) may become a substantial bottleneck (i.e., a significant source of latency) once the level of traffic through the IS 20(A) approaches the maximum throughput of the IS 20(A). Unfortunately, if a second IS 20(B) is added as a front-end to additional data storage arrays 24(B)(1), 24(B)(2), 24(B)(3), each client 22 must be manually reconfigured to view each IS 20(A), 20(B) as a separate array and thus be burdened with having to communicate with multiple arrays.

In contrast to the above-described conventional approaches, embodiments of the invention are directed to techniques for presenting multiple data storage systems to iSCSI clients as a single aggregated network array using an aggregator device which (i) manages communications between the iSCSI clients and the data storage systems, and (ii) is disposed outside the data path in an "out-of-band" manner. Accordingly, the aggregator device does not operate as a bottleneck to data throughput, and the iSCSI clients are capable of enjoying low latency communications with the data storage systems. Moreover, since the aggregator device is not in the data path, there is virtually no limit to scalability and certain tasks such as transparent volume migration are easily accomplished.

One embodiment of the invention is directed to an aggregator device having a network interface, a controller, and a communications bus coupling the network interface to the controller. The controller is configured to provide the client with a list of storage areas which are offered by the single aggregated network array. The storage areas on the list are provided by the multiple data storage systems and are accessible by the client using data paths which are out-of-band with the aggregator device. The controller is further configured to receive an iSCSI login request from the client, the iSCSI login request identifying a particular storage area on the list of storage areas. The controller is further configured to generate and send an iSCSI login result to the client in response to the iSCSI login request. The iSCSI login result includes a network address (e.g., an IP address) of a particular data storage system of the multiple data storage systems which provides the particular storage area to enable the client to directly access the particular storage area using a data path which is out-of-band with the aggregator device.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the invention are directed to techniques for presenting multiple data storage systems to iSCSI clients as a single aggregated network array using an aggregator device which (i) manages communications between the iSCSI clients and the data storage systems, but (ii) is disposed outside the data path in an "out-of-band" manner. As a result, the aggregator device does not operate as a bottleneck to data throughput, and the iSCSI clients are capable of enjoying low latency communications with the data storage systems. Moreover, since the aggregator device is not in the data path, there is virtually no limit to scalability and certain tasks such as transparent volume migration are easily accomplished.

Figure 2:
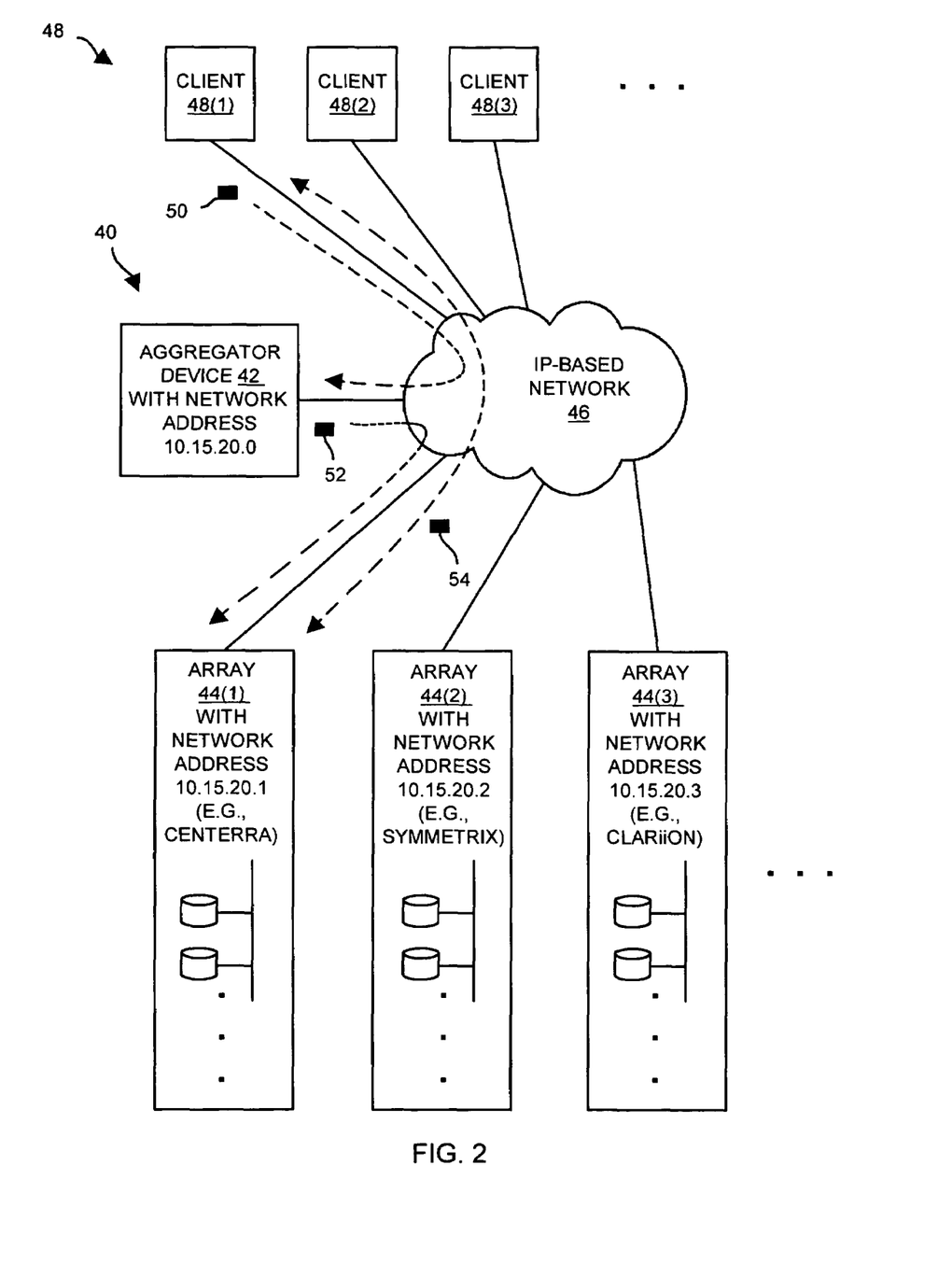
FIG. 2. is a block diagram of an aggregated network array which is suitable for use by the invention.

FIG. 2 shows an aggregated network array 40 which is suitable for use by the invention. The aggregated network array 40 includes an aggregator device 42, multiple data storage arrays 44(1), 44(2), 44(3), . . . (collectively, data storage arrays 44), and an IP-based network 46. As shown in FIG. 2, the IP-based network 46 connects a set of iSCSI clients 48(1), 48(2), 48(3), . . . (collectively, iSCSI clients 48) with the aggregator device 42 and with the data storage arrays 44. The IP-based network 46 enables the clients 48, the aggregator device 42 and the data storage arrays 44 to communicate with each other using TCP/IP-based communications, i.e., by exchanging packets over Ethernet connections.

The aggregator device 42 is configured to present the data storage systems 44 to each client 48 as a single aggregated network array 40 thus alleviating the need for a user at each client 48 to manually coordinate the use of multiple arrays. In particular, the aggregator device 42 handles, among other things, (i) initial configuration of the data storage systems 44 into the single aggregated network array 40 (e.g., set up), (ii) access to the array 40 during normal operation of the array 40 (e.g., security and authentication), and (iii) maintenance and management of the array 40 (e.g., volume management and migration). However, in contrast to a conventional Intelligent Switch which sits within the data path between iSCSI clients and data storage arrays (e.g., see FIG. 1), the aggregator device 42 resides outside the data path, i.e., out-of-band. Accordingly, the aggregator device 42 is in a position which is well-suited for responding to iSCSI login commands 50 (see the block 50 and the dashed arrow representing an iSCSI discovery login command from the client 48(1) to the aggregator device 42 in FIG. 2) and initiating iSCSI commands 52 (see the block 52 and the dashed arrow representing an iSCSI command from the aggregator device 42 to one of the data storage systems 44 in FIG. 2). However, the aggregator device 42 does not need to handle iSCSI commands which transfer data between the clients 48 and the data storage systems 44. Rather, the clients 48 and the data storage systems 44 are capable of exchanging iSCSI commands 54 (e.g., those which transfer data) directly along data paths which are out-of-band with the aggregator device 42 (see the block 54 and the dashed arrow representing iSCSI commands transferring data between the client 48(1) and the data storage array 44(1) in FIG. 2).

It should be understood that the out-of-band positioning of the aggregator device 42 makes the aggregator device 42 deployable virtually at any location of the network 46. As such, the aggregator device 42 is capable of being located within any router, switch or network node. There is no need for any Intelligent Switch in the data path.

As shown in FIG. 2, the aggregator device 42 and each data storage system 44 has a network address and is accessible using TCP/IP communications. By way of example only, the aggregator device 42 has an IP address of 10.15.20.0. The data storage system 44(1) has an IP address of 10.15.20.1. Additionally, the data storage system 44(2) has an IP address of 10.15.20.2. Furthermore, the data storage system 44(3) has an IP address of 10.15.20.3. Since there is pure Ethernet connectivity between each IP-networked device 42, 44, 48, there is no SAN-based infrastructure (e.g., Fibre Channel) required.

At this point, it should be understood that there is no requirement that the data storage systems 44 be homogenous in design/architecture, capacity and performance. Rather, the data storage systems 44 are capable of having different designs/architectures and capacities, and capable of providing different performance. By way of example, the data storage system 44(1) is a Celera® data storage array, the data storage system 44(2) is a Symmetrix® data storage array, and the data storage system 44(3) is a CLARiiON® data storage array, each of which is provided by EMC Corporation of Hopkinton, Mass. Accordingly, each data storage system 44 has a different design/architecture, different storage capacity, and different performance. Moreover, a new data storage system 44 can be added to the aggregated network array 40 simply by connecting a new data storage system 44 to the network 46 after which the aggregator device 42 automatically updates its representation of the network array 40.

Such flexibility offers convenient scaling and volume migration options to a user of the aggregated network array 40. For example, suppose that a user starts with a mid-level Celera® or CLARiiON® data storage array 44 in a maximum configuration in combination with the aggregator device 42. Furthermore, suppose that the user now wishes to increase storage capacity. Rather than replace that initial data storage array 44 with a larger capacity storage array 44, the user is capable of maintaining that initial data storage array 44 and adding another data storage array 44 (e.g., another Celera®, a Symmetrix®, etc.).

As will be explained in further detail shortly, the aggregator device 42 presents the multiple data storage arrays 44 as a single aggregated network array 40 to the clients 48. There is no need to manually reconfigure the clients 48, Furthermore, there is no concern whether the aggregator device 42 can handle an increase in data throughput since the aggregator device 42 is out-of-band to any data path (e.g., see the dashed arrow 54 in FIG. 2). That is, the aggregator device 42 does not impose a data throughput limitation on scalability as do conventional Intelligent Switches. Further details of the invention will now be provided with reference to FIG. 3.

Figure 3:
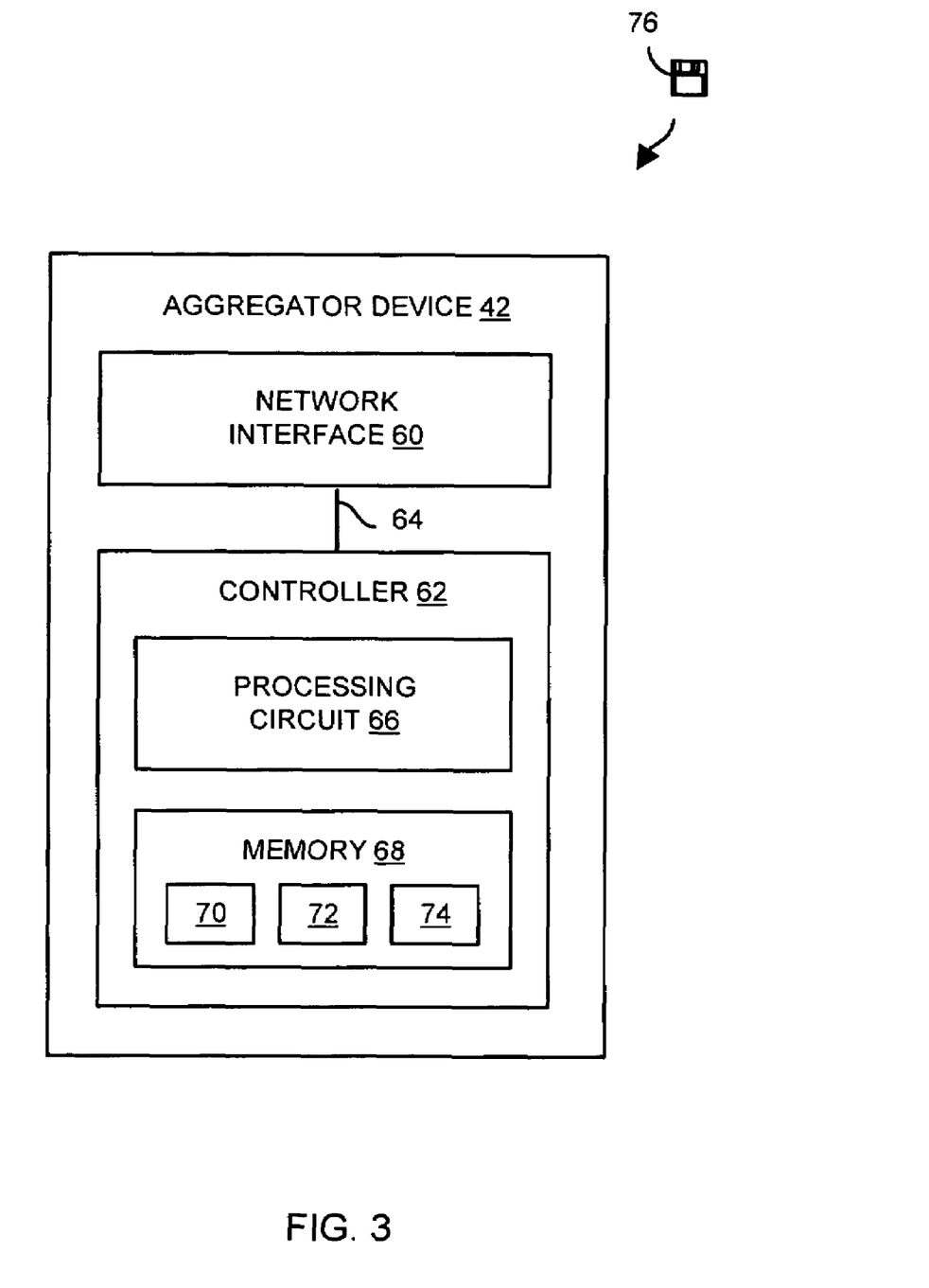
FIG. 3 is a block diagram of an aggregator device of the aggregated network array of FIG. 2.

FIG. 3 is a block diagram of the aggregator device 42 of the aggregated network array 40. The aggregator device 42 includes a network interface 60, a controller 62, and a communications bus 64 which couples the network interface 60 to the controller 62. The network interface 60 (e.g., an Ethernet card or network interface chip) is configured to provide IP-based communications between external devices (e.g., see the data storage arrays 44 and the iSCSI clients 48 of FIG. 2) and the controller 62.

The controller 62 includes a processing circuit 66 and memory 68. The memory 68 stores, among other things, an operating system 70, an aggregator application 72, and a database 74. The operating system 70 directs the processing circuit 66 to effectively allocate and manage resources (e.g., memory space, processor time, etc.) of the aggregator device 42. The aggregator application 72 directs the processing circuit 66 to utilize the database 74 while communicating with the data storage arrays 44 and the clients 48 during iSCSI login operations (also see the iSCSI communication signals 50, 52 in FIG. 2). Further details of how such operations take place will be provided shortly.

It should be understood that the operating system 70 and the aggregator application 72 are capable of installing into the aggregator device 42 from a computer program product 76. The computer program product 76 includes instructions in a tangible form (e.g., CDROM, magnetic tape, magnetic disk, a network download, a propagated signal, etc.) which, when performed by a computer processor (e.g., the processing circuit 66), direct the processor to present the data storage arrays 44 as the single aggregated network array 40. Further details of the invention will now be provided with reference to FIG. 4.

Figure 4:
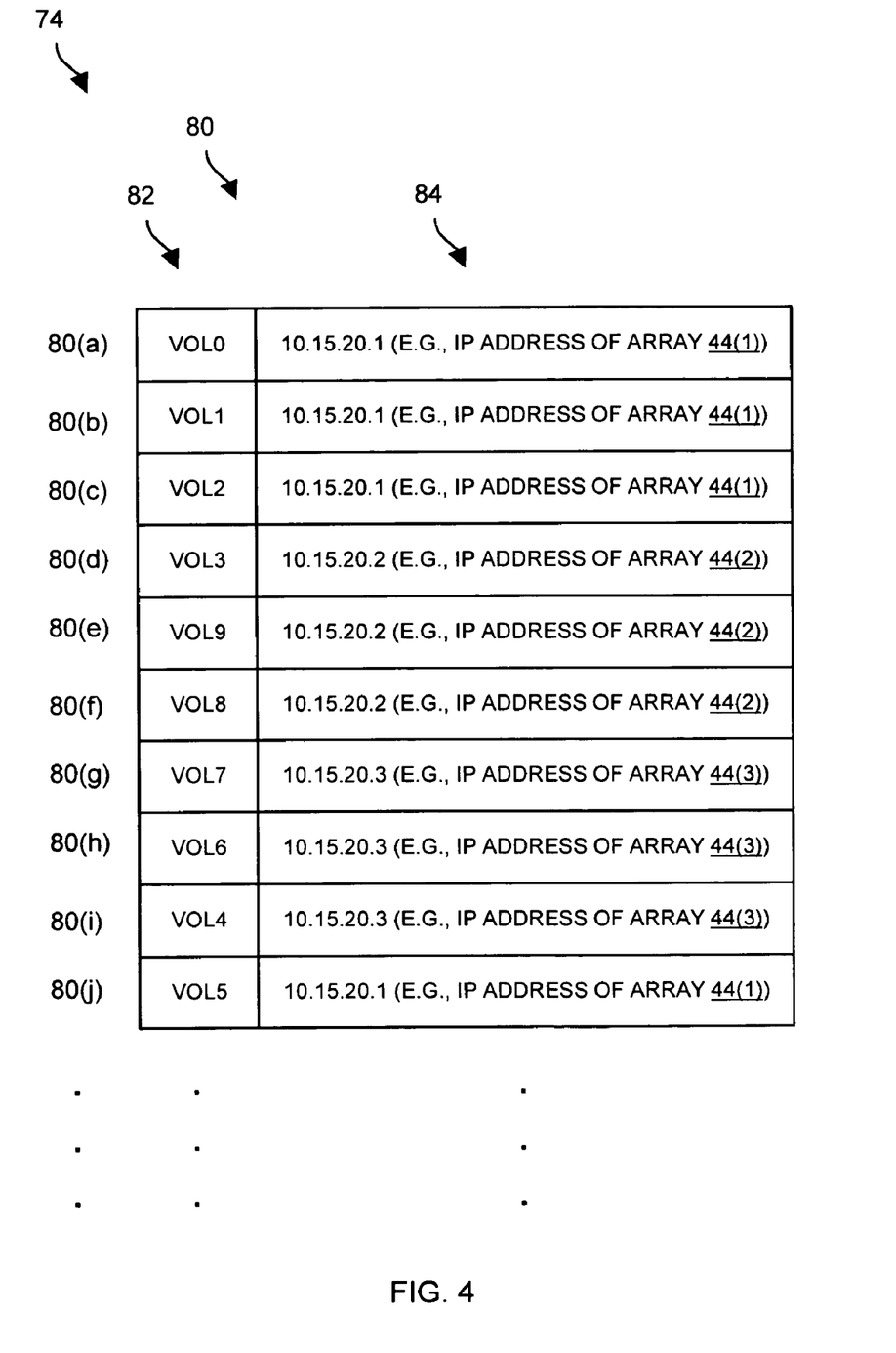
FIG. 4 is a block diagram of a database which is utilized by the aggregator device of FIG. 3.

FIG. 4 is a block diagram of the database 74 stored in the memory 68. The database 74 is illustrated logically as a table of entries 80(a), 80(b), . . . (collectively, entries 80). Each entry 80 includes a volume identifier field 82 and a network address field 84. The contents of the volume identifier field 82 of each entry 80 indicate a unique volume identifier (e.g., a unique volume name) of the aggregated network array 40, and the contents of the network address field 84 of that entry 80 indicate the network address of the particular data storage system 44 (also see FIG. 2) which stores a volume having that unique volume identifier. Other information can be stored in the entries 80 as well such as system names and attributes, log information, etc.

In one arrangement, a system administrator configures the aggregator device 42 when the data storage systems 44 are initially installed. Here, the system administrator runs the aggregator application 72 on the aggregator device 42 to assign unique volume identifiers (e.g., volume names "VOL0", "VOL1", etc.) to various storage areas provided by the data storage systems 44. The aggregator device 42 communicates these assignments to the various data storage systems 44 so that the data storage systems 44 allocate such storage properly on their ends (e.g., see the signal 52 in FIG. 2).

In another arrangement, the system administrator system installs the aggregator device 42 to operate with one or more pre-existing data storage systems 44. Here, the operation of each data storage system 44 is extended to enable reassigning new volume identifiers in place of pre-existing volume identifiers (e.g., renaming existing volume names with new volume names). Accordingly, the system administrator runs the aggregator application 72 on the aggregator device 42 to assign volume identifiers (e.g., volume names) such that each volume identifier is unique (again, see the signal 52 in FIG. 2).

By way of example only, the entries 80(a), 80(b), 80(c) and 80(j) respectively indicate that volumes VOL0, VOL1, VOL2 and VOL5 reside on the network device having an IP address of 10.15.20.1, namely the data storage system 44(1). Similarly, the entries 80(d), 80(e) and 80(f) respectively indicate that volumes VOL3, VOL9 and VOL8 reside on the network device having an IP address of 10.15.20.2, namely the data storage system 44(2). Furthermore, the entries 80(g), 80(h) and 80(i) respectively indicate that volumes VOL7, VOL6 and VOL4 reside on the network device having an IP address of 10.15.20.3, namely the data storage system 44(3).

Further details of how the aggregator device 42 presents the data storage systems 44 as a single aggregated network array 40 to the clients 48 will now be provided. In order for a client 48 to access a particular storage area within the array 40, the client 48 first issues a "discovery login" command to the aggregator device 42 (e.g., see the signal 50 in FIG. 2). The "discovery login" command is a general login instruction to obtain high level access to the aggregated network array 40. The aggregator device 42 responds to the client 48 by sending a confirmation that the client 48 is now logged in (e.g., a signal in the direction which is opposite the signal 50 in FIG. 2).

Next, the client 48 issues a "sendtargets" command to the aggregator device 42. The "sendtargets" command is a request for a list of storage areas that the client 48 is allowed to access. The aggregator device 42 responds to the client 48 by providing a list of storage areas that the aggregator device 42 will allow the client 48 to access. In the list, each entry includes a uniquely named storage area (e.g., VOL0) and an associated IP address which is the IP address of the aggregator device 42 (e.g., 10.15.20.0).

Then, the client 48 issues a "full feature login" command to the aggregator device 42. The "full feature login" command specifies a particular storage area that the client 48 wishes to access (e.g., VOL0). In response, the aggregator device 42 searches the database 74 for an entry 80 containing the particular storage area in its volume identifier field 82. Once the aggregator device 42 finds the entry 80 (e.g., see the entry 80(a) for VOL0 in FIG. 4), the aggregator device 42 responds to the "full feature login" command with a "login redirect" response and the IP address from the network address field 84 of that entry 80 (e.g., 10.15.20.1 for the entry 80(a) in FIG. 4). The IP address identifies the specific data storage system 44 on which the particular storage area resides (e.g., the data storage array 44(1)).

When the client 48 receives the "login redirect" response from the aggregator device 42 as a result of the "full feature login" command, the client 48 retries the "full feature login" command with the data storage system 44 identified by the IP address in the "login redirect" response. In particular, the client 48 sends a "full feature login" command directly to the specific data storage system 44 (e.g., a signal 54 sent from the client 48 to the data storage array 44(1) as shown in FIG. 2).

Once the client 48 is logged in with the specific data storage array 44, the client 48 is capable of accessing the particular storage area. As illustrated by the signal 54 in FIG. 2, the data path for data exchanged between the client 48 and the specific data storage array 44 is out-of-band with the aggregator device 42. Since the aggregator device 42 is not in the data path, the client 48 and data storage array 44 enjoy bandwidth which is unhindered by the aggregator device 42. Furthermore, the input and output ports of the aggregator device 42 (see the network interface 60 in FIG. 3) are not burdened with traffic from the data exchange thus enabling robust operation of the aggregator device 42.

It should be understood that the above-described communications utilize standard iSCSI operations. Accordingly, the clients 48 are simply configured to operate as iSCSI devices in the same manner as conventional iSCSI clients. However, unlike conventional iSCSI clients which are manually configured to keep track of data storage arrays individually, high level applications running on the client 48 simply need to keep track of one aggregated network array 40 and can simply rely on the iSCSI protocol to coordinate access to multiple data storage arrays 44 in an automated manner. Moreover, there is virtually no limit to scalability so that there is little or no likelihood that the clients 48 will ever need to keep track of more than one array as in conventional approaches. A summary of the above-described operation of the aggregator device 42 will now be provided with reference to FIG. 5.

Figure 5:
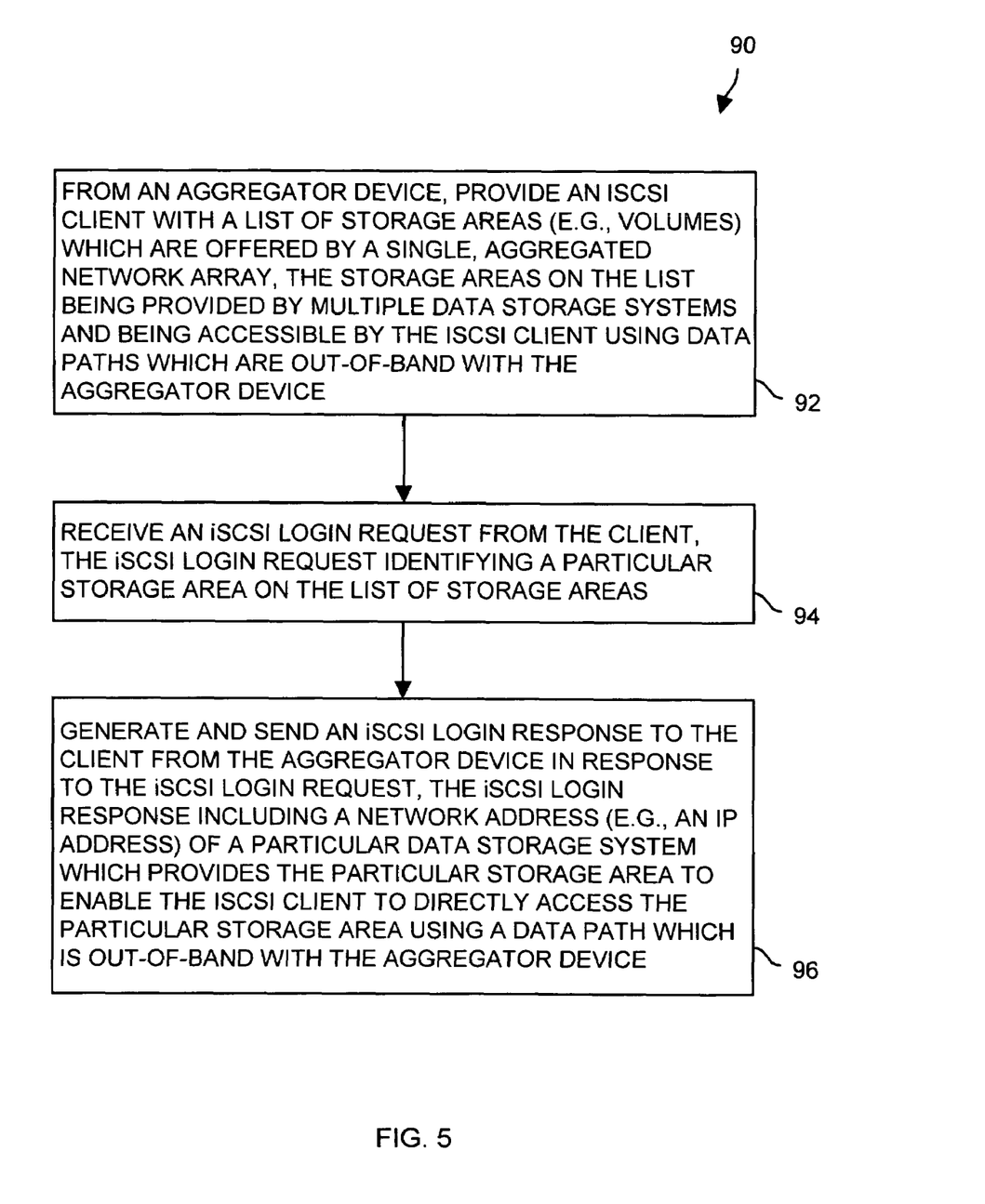
FIG. 5 is a flowchart illustrating a procedure which is performed by the aggregator device of FIG. 2.

FIG. 5 is a flowchart of a procedure 90 which is performed by the aggregator device 42 in order to present the aggregated network array 40 to a client 48 as a single array. In step 92, the aggregator device 42 responds to a "sendtargets" command from the client 48 with a list of storage areas which are offered by the single aggregated network array 40. The storage areas on the list are provided by the multiple data storage systems 44 and are accessible by the client 48 using data paths which are out-of-band with the aggregator device 42 (e.g., see the data path 54 in FIG. 2).

In step 94, the aggregator device 42 receives an iSCSI login request (i.e., a "full feature login" command) from the client 48. In particular, the processing circuit 66 receives the request through the communications bus 64 and the network interface 62. The iSCSI login request identifies, among other things, a particular storage area to be accessed.

In step 96, the aggregator device 42 generates and sends an iSCSI login response (i.e., a "login redirect" response) to the client 48 in response to the iSCSI login request. In particular, the processing circuit 66 outputs the response through the communications bus 64 and the network interface 62. The iSCSI login response includes the network address of the particular data storage system 44 which provides the particular storage area. As a result, the client 48 is now able to access the particular storage area using a data path which is out-of-band with the aggregator device 42 (e.g., by performing a "full feature login" directly with the particular data storage system 44 identified by the network address.

It should be understood that the procedure 90 is repeatable for each client 48. Accordingly, each client 48 is capable of enjoying robust iSCSI connectivity with multiple data storage systems 44, and needs only to be configured to view the aggregator device 42 initially. From that point on, the clients 48 perceive access to the data storage systems 44 as access to a single aggregated network array 40.

Furthermore, it should be understood that the aggregator device 42 is capable of performing certain advantageous tasks such as transparent volume migration. For example, suppose that the client 48(1) currently accesses VOL1 on the data storage system 44(1), but that the system administrator wishes to shutdown the data storage system 44(1) to perform periodic maintenance. To handle this situation, the system administrator directs the aggregator application 72 running on the aggregator device 42 to transparently migrate VOL1 (and perhaps other storage areas provided by the data storage system 44(1)) from the data storage system 44(1) to the data storage system 44(2). The aggregator device 42 responds by (i) placing a copy of VOL1 on the data storage system 44(2) or instructing the data storage system 44(1) to place a copy of VOL1 on the data storage system 44(2), and then (ii) directing the data storage system 44(1) to request an iSCSI logout logoff to logoff the client 48(1). In response, the data storage system 44(1) sends an asynchronous logout request to the client 48(1). This has the effect of notifying the client 48(1) that it must log into the aggregator device 42 again in order to further access VOL1. That is, for further access of VOL1, the client 48(1) must send a new "full feature login" to the aggregator device 42, and the aggregator device 42 responds to this "full feature login" with a "login redirect" response and the IP address of the data storage system 44 having the copy of VOL1, i.e., the data storage system 44(2). Again, access of the storage area at the data storage system 44(2) is out-of-band with the aggregator device 42. Moreover, the data storage system 44(1) can be taken offline for maintenance. The aggregated network array 40 as a whole remains operational and the client 44(1) is never deprived of access to VOL1.

As mentioned above, embodiments of the invention are directed to techniques for presenting multiple data storage systems 44 to iSCSI clients 48 as a single aggregated network array 40 using an aggregator device 42 which (i) manages communications between the iSCSI clients 48 and the data storage systems 44, but (ii) is disposed outside the data path in an "out-of-band" manner. As a result, the aggregator device 42 does not operate as a bottleneck to data throughput, and the iSCSI clients 48 are capable of enjoying low latency communications with the data storage systems 44. Moreover, since the aggregator device 42 is not in the data path, there is virtually no limit to scalability and certain tasks such as transparent volume migration are easily accomplished.

The above-described iSCSI network array 40 enables users to manage and provision iSCSI storage across multiple data storage systems 44 as if such storage resided in a single seamless storage pool. Moreover, the array 40 provides ease-of-use (e.g., transparent volume migration), and the user no longer needs to provision storage on an array-by-array basis as in conventional data storage approaches.

While this invention has been particularly shown and described with references to preferred embodiments thereof, it will be understood by those skilled in the art that various changes in form and details may be made therein without departing from the spirit and scope of the invention as defined by the appended claims.

For example, the controller 62 was described above as being implemented using a processing circuit 66 and software constructs 70, 72, 74 stored in memory 68. In other arrangements, the controller 62 is implemented differently such as by Application Specific Integrated Circuits (ASICs), Field Programmable Gate Arrays (FPGAs), combinations thereof, and the like.

Additionally, the storage areas were described above as volumes by way of example only. Other storage area constructs are suitable for use as well such as LUNs, disk drives, sectors, cache lines, blocks, files, pages, etc.

Furthermore, the constituent data storage systems 44 were described above as being different types of systems (e.g., Celera®, Symmetrix®, CLARiiON®) by way of example only. In other arrangements, the systems 44 include the same type or systems 44 or even other types of systems (e.g., Centera®), or combinations thereof.

What is claimed is:

1. An aggregator device for presenting multiple data storage systems to a client as a single aggregated network array, comprising:
   a network interface;
   a controller; and
   a communications bus coupling the network interface to the controller, the controller being configured to:
   through the communications bus and the network interface, provide the client with a list of storage areas which are offered by the single aggregated network array, the storage areas on the list being provided by the multiple data storage systems and being accessible by the client using data paths which are out-of-band with the aggregator device;
   through the communications bus and the network interface, receive an iSCSI login request from the client, the iSCSI login request identifying a particular storage area on the list of storage areas; and
   generate and send, through the communications bus and the network interface, an iSCSI login result to the client in response to the iSCSI login request, the iSCSI login result including a network address of a particular data storage system of the multiple data storage systems which provides the particular storage area to enable the client to directly access the particular storage area using a data path which is out-of-band with the aggregator device.

2. The aggregator device of claim 1 wherein the controller includes:
   memory which stores a table of entries, each entry identifying a storage area and a data storage system providing that storage area; and
   a processing circuit which, when generating and sending the iSCSI login result, is configured to:
      search the table of entries to find an entry which identifies the particular storage area and the particular data storage system which provides the particular storage area, and
      provide, as the network address, an IP address of the particular data storage system.

3. The aggregator device of claim 2 wherein the particular storage area provided by the particular data storage system is a volume of a set of volumes managed by the aggregator device, and wherein the controller is further configured to:
   after the client has accessed the volume, transparently direct movement of the volume from the particular data storage system to another data storage system, and
   configure the particular data storage system to provide a notification to the client instructing the client to communicate with the aggregator device.

4. The aggregator device of claim 3 wherein the controller, when configuring the particular data storage system to provide the notification, is configured to:
   direct the particular data storage system to provide an iSCSI logout request to the client to force the client to provide a new iSCSI login request to the aggregator device.

5. The aggregator device of claim 1 wherein the controller is further configured to:
   prior to receiving the iSCSI login request, assign new volume identifiers on the data storage systems to volumes provided by the data storage systems to configure the single aggregated network array for operation, the particular storage area being a volume provided by the particular data storage system and being assigned a particular volume identifier.

6. The aggregator device of claim 1 wherein the data storage systems initially provide volumes assigned with initial volume identifiers, and wherein the controller is further configured to:
   prior to receiving the iSCSI login request, assign new volume identifiers to the volumes in place of the initial volume identifiers to configure the single aggregated network array for operation, the storage area being a volume provided by the particular data storage system and being assigned a particular new volume identifier.

7. The aggregator device of claim 1 wherein the controller is further configured to:
   provide lists of storage areas to multiple other clients;
   receive iSCSI login requests from multiple other clients; and
   generate and send iSCSI login results to the other clients in response to the iSCSI login requests, the iSCSI login results including network addresses of the multiple data storage systems to enable the multiple other clients to directly access the particular storage area using data paths which are out-of-band with the aggregator device.

8. The aggregator device of claim 1 wherein the network interface is one of an Ethernet card and a network interface chip which is configured to directly input IP-based signals from external devices and outputting IP-based signals to the external devices to enable the aggregator device to have pure Ethernet connectivity with the client and the multiple data storage systems.

9. The aggregated device of claim 1 wherein the controller is further configured to:
   prior to providing the client with the list of storage areas, (i) receive and accept an iSCSI discovery login request from the client through the communications bus and the network interface, and (ii) receive and accept an iSCSI sendtargets request from the client through the communications bus and the network interface, the list of storage areas being provided in response to the iSCSI sendtargets request.

10. In an aggregator device, a method of presenting multiple data storage systems to a client as a single aggregated network array, the method comprising:
   providing the client with a list of storage areas which are offered by the single aggregated network array, the storage areas on the list being provided by the multiple data storage systems and being accessible by the client using data paths which are out-of-band with the aggregator device;
   receiving an iSCSI login request from the client, the iSCSI login request identifying a particular storage area on the list of storage areas; and
   generating and sending an iSCSI login result to the client in response to the iSCSI login request, the iSCSI login result including a network address of a particular data storage system of the multiple data storage systems which provides the particular storage area to enable the client to directly access the particular storage area using a data path which is out-of-band with the aggregator device.

11. The method of claim 10 wherein the aggregator device includes a table of entries, each entry identifying a storage area and a data storage system providing that storage area, and wherein generating and sending the iSCSI login result includes:
   searching the table of entries to find an entry which identifies the particular storage area and the particular data storage system which provides the particular storage area; and
   providing, as the network address, an IP address of the particular data storage system.

12. The method of claim 11 wherein the particular storage area provided by the particular data storage system is a volume of a set of volumes managed by the aggregator device, and wherein the method further comprises:
   after the client has accessed the volume, transparently directing movement of the volume from the particular data storage system to another data storage system; and
   configuring the particular data storage system to provide a notification to the client instructing the client to communicate with the aggregator device.

13. The method of claim 12 wherein configuring the particular data storage system to provide the notification includes:
   directing the particular data storage system to provide an iSCSI logout request to the client to force the client to provide a new iSCSI login request to the aggregator device.

14. The method of claim 10, further comprising:
   prior to receiving the iSCSI login request, assigning volume identifiers to volumes provided by the data storage systems to configure the single aggregated network array for operation, the particular storage area being a volume provided by the particular data storage system and being assigned a particular volume identifier.

15. The method of claim 10 wherein the data storage systems initially provide volumes assigned with initial volume identifiers, and wherein the method further comprises:

prior to receiving the iSCSI login request, assigning new volume identifiers to the volumes in place of the initial volume identifiers to configure the single aggregated network array for operation, the particular storage area being a volume provided by the particular data storage system and being assigned a particular new volume identifier.

16. The method of claim 10, further comprising:

providing lists of storage areas to multiple other clients;

receiving iSCSI login requests from multiple other clients; and generating and sending iSCSI login results to the other clients in response to the iSCSI login requests, the iSCSI login results including network addresses of the multiple data storage systems to enable the multiple other clients to directly access the particular storage area using data paths which are out-of-band with the aggregator device.

17. The method of claim 10 wherein each of (i) providing the list, (ii) receiving the iSCSI login request, and (iii) generating and sending the iSCSI login result includes:

directly inputting IP-based signals from external devices and outputting IP-based signals to the external devices to enable the aggregator device to have pure Ethernet connectivity with the client and the multiple data storage systems.

18. An aggregated network array, comprising:

multiple data storage systems;

an aggregator device which communicates with the multiple data storage systems using IP-based communications, the aggregator device being configured to present the multiple data storage systems to a client as a single array, the aggregator device including:
  a network interface;
  a controller; and
  a communications bus coupling the network interface to the controller, the controller being configured to:
    through the communications bus and the network interface, provide the client with a list of storage areas which are offered by the single aggregated network array, the storage areas on the list being provided by the multiple data storage systems and being accessible by the client using data paths which are out-of-band with the aggregator device;
    through the communications bus and the network interface, receive an iSCSI login request from the client, the iSCSI login request identifying a particular storage area on the list of storage areas; and
    generate and send, through the communications bus and the network interface, an iSCSI login result to the client in response to the iSCSI login request, the iSCSI login result including a network address of a particular data storage system of the multiple data storage systems which provides the particular storage area to enable the client to directly access the particular storage area using a data path which is out-of-band with the aggregator device.

19. The aggregated network array of claim 18 wherein the multiple data storage systems include:

at least one EMC Symmetrix-platform storage array and at least one EMC CLARiiON-platform storage array.

20. The aggregated network array of claim 18 wherein the controller is further configured to:

prior to providing the client with the list of storage areas, (i) receive and accept an iSCSI discovery login request from the client through the communications bus and the network interface, and (ii) receive and accept an iSCSI sendtargets request from the client through the communications bus and the network interface, the list of storage areas being provided in response to the iSCSI sendtargets request.

* * * * *